Aug. 20, 1957 H. MAGNUSKI ET AL 2,803,802

DEVIATION CALIBRATOR

Filed April 27, 1954

INVENTORS
Henry Magnuski
Edwin Dyke
BY Mueller & Aichele
Attys.

2,803,802

DEVIATION CALIBRATOR

Henry Magnuski, Chicago, and Edwin Dyke, Brookfield, Ill., assignors to Motorola, Inc., Chicago, Ill., a corporation of Illinois Application April 27, 1954, Serial No. 425,989

5 Claims. (Cl. 332—20)

Figure 1:
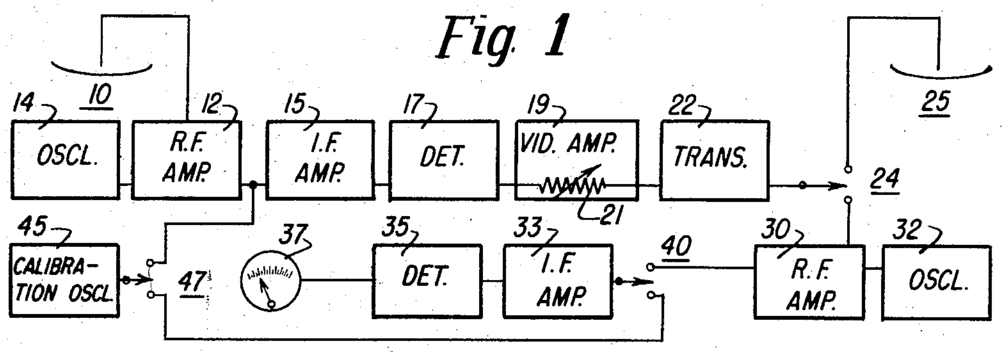

This invention relates generally to frequency modulated microwave relay communication systems and more particularly to a method and apparatus for testing and determining the frequency deviation of repeater stations in such systems.

Communication using microwave frequencies is at the present time accomplished through frequency modulating a microwave carrier signal with one or more subcarrier waves which contain the intelligence. At microwave frequencies only small power can be radiated and line of sight is generally maintained so that a plurality of repeater stations are required along a system of considerable length. These repeater stations may consist of a receiver of the superheterodyne type, an amplifier to increase the signal level, and a transmitter to retransmit the signal.

The extent of frequency deviation of the microwave carrier signal utilized in such a system may become of considerable importance for satisfactory operation. This is the case in a wideband system using several repeater stations and wherein one or more stations may relay the signal at a modulation percentage different from that of the received signal. If this modulation percentage is changed as the signal is translated through a repeater station, general performance of the system may suffer. If the modulation percentage becomes too high, distortion and cross talk may be encountered, while if it becomes too low the signal to noise ratio is reduced.

In practical design of a microwave system, a selected deviation of the carrier wave may be chosen as a certain percentage of the maximum deviation that the equipment could pass. The term modulation percentage is applied to this selected deviation and it is desirable that this percentage remain constant throughout the system for the above described reasons.

In a system of the type being described, that is where there are a plurality of repeater stations, if there are a number of stations which do not provide unity modulation gain, the effect of this variation could be cumulative across the entire system. For example, if several stations are adjusted to provide less than unity modulation gain, the resulting signal will be reduced in modulation percentage by a factor corresponding to the misadjustment of each station and the difficulties mentioned may be encountered. The situation is similar for a group of repeater stations which translate the signal at greater than unity modulation gain.

The modulation percentage of the signal transmitted from a relay station is controlled by the amplitude of the modulation signal applied to the modulator of the transmitter thereof. Therefore, by adjusting the amplification of the amplifier stage feeding the repeater station transmitter modulator, the desired modulation percentage of the relayed signal may be established. It is a system of this type to which the present invention finds particular application. In the co-pending application of Edwin Dyke and Henry Magnuski, filed March 6, 1952, Serial Number 275,188, and entitled "Modulation Meter," equipment is described and claimed for determining whether or not the modulation gain of a repeater station is unity. However, for such equipment to provide accurate measurement of the absolute value of the modulation percentage, the meter thereof must be calibrated frequently.

It is an object of the present invention to provide an improved deviation calibrator for calibrating modulation meters or other frequency modulation detecting means at a known frequency and selected modulation percentage.

It is a further object of the invention to provide an improved deviation calibrator for microwave modulation measuring equipment which is both simple and inexpensive in construction.

A feature of the invention is the provision of a calibrator circuit to establish a known deviation indication of a modulation meter, including a pair of oscillators having outputs spaced in frequency by an amount related to the desired standard deviation and means to key these oscillators to provide a signal varying in frequency about a selected center frequency. The oscillators may be fixed in frequency so that no adjustment is necessary by an operator.

A further feature is the provision of a deviation calibrator including a multivibrator circuit for keying signals of selected frequencies alternately at a predetermined rate to provide a known standard for calibration purposes. The calibrator compensates for the differing effect of abrupt changes in frequency produced by the standard as compared to smooth or sinusoidal changes produced by normal modulation.

Figure 2:
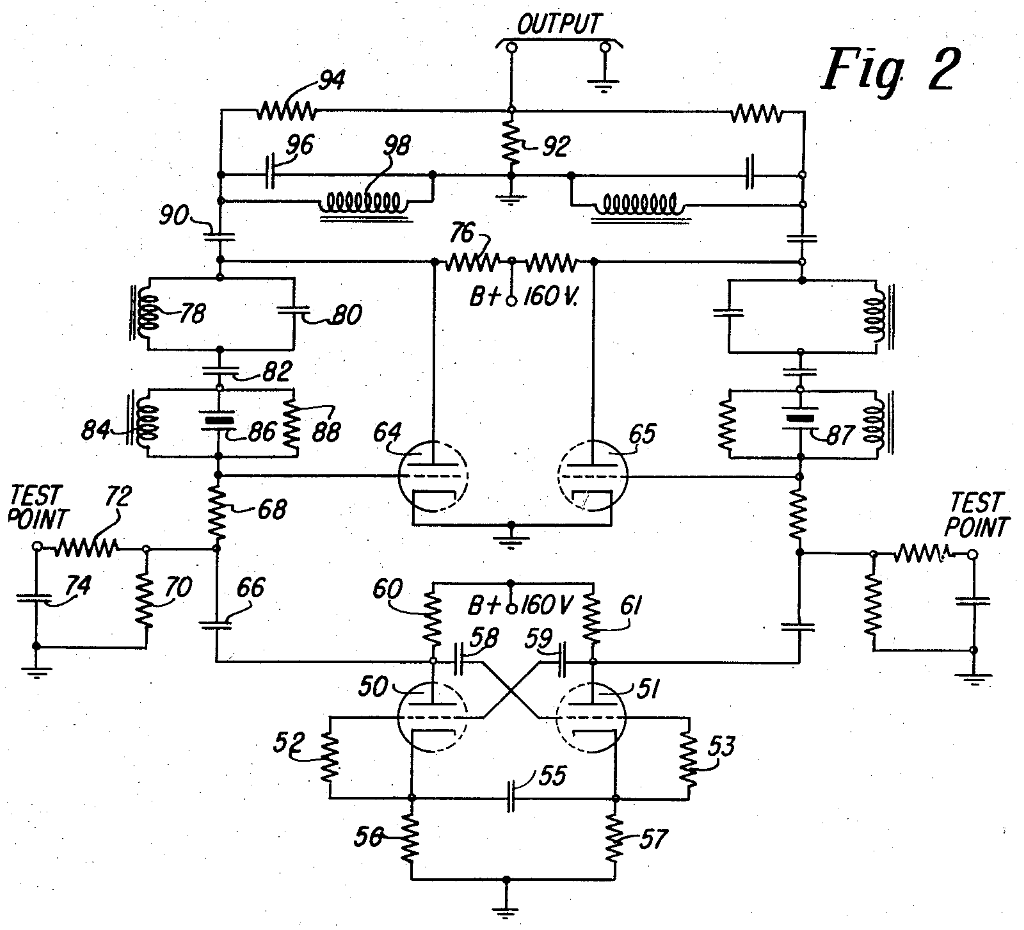

Further objects, features and the attending advantages thereof will be apparent upon consideration of the following drawings in which:

Fig. 1 is a block diagram of a microwave repeater station and associated test apparatus incorporating the present invention; and Fig. 2 is a schematic diagram of the deviation calibrator of the invention.

In practicing the invention there is provided a deviation calibrator for establishing an indication of a modulation meter which is a measure of a selected standard deviation of a carrier wave. Included in the calibrator circuit are a pair of oscillators operative at the equivalent of the limits of a selected standard deviation, and multivibrator means to alternately key the oscillators at a given frequency. The circuit is used by coupling it to a modulation meter, which is essentially a frequency modulation receiver with a measuring instrument in the discriminator circuit to indicate the frequency deviation of a signal impressed thereon, to produce an indication thereof for use as a standard of comparison. Construction of the calibrator is such that the signal provided is frequency modulated between the same limits as the desired deviation at the intermediate frequency of the modulation meter so that the deviation calibrator may be coupled directly to the intermediate frequency stage of this meter during the calibration. Compensation is provided for the different modulation wave form of the standard and of normal modulation in the system. The deviation calibrator may also be coupled to the intermediate frequency stage of a receiver in a radio relay repeater station to furnish a signal of known deviation when this station is being adjusted to provide a desired modulation percentage.

Referring now to Fig. 1, there is shown a microwave repeater station with the necessary circuitry for testing and adjusting the modulation gain thereof. Included are a microwave receiving antenna 10 which is coupled to a mixing stage 12 where the received signal is heterodyned by a signal from the oscillator circuit 14. This produces a selected intermediate frequency signal which is applied to the intermediate frequency amplifier 15 and from there to the detector circuit 17. The detected frequency modulated signal is then coupled to a video amplifier 19 which amplifies this signal prior to re-transmission thereof. A variable control 21 is provided in this amplifier and this adjusts the amount of gain of this circuit. The signal is then applied to the transmitter 22 from which it passes through the contacts of switch 24 to the transmitting antenna 25. As previously mentioned, the deviation of the signal transmitted will depend upon the amplitude of the signal applied to the transmitted 22 from the amplifier 19 in the system of the type described herein.

In order to obtain a measurement of the modulation percentage of the signal transmitted by this repeater station, the switch 24 may be moved to a downward position which connects the output of the transmitter 22 to a modulation meter. This meter consists of a superheterodyne circuit with a meter indicator connected to the discriminator thereof to produce an indication corresponding to the deviation of a frequency modulated signal applied thereto. Included are a radio frequency amplifier 30 to which the signal to be tested is applied, an oscillator 32 which produces a signal for heterodyning with the signal to be tested, as well as an intermediate frequency amplifier 33 and a detector stage 35. The detector stage is coupled to an indicating device 37 which responds to the deviation of the signal under test. A switch 40 is provided between the radio frequency stage 30 and the intermediate frequency amplifier stage 33 so that an external signal may be applied to the intermediate frequency amplifier stage.

Considering now the operation of the system to test and adjust the repeater station, the steps to accomplish this include calibration of the modulation meter, comparison of the modulation gain of the repeater station equipment with this calibration, and then any necessary adjustment of the repeater station equipment to provide the desired modulation gain. In calibrating the modulation meter, switch 40 may be positioned downwardly to connect the calibrator oscillator 45 through switch 47, also positioned downwardly, to apply a signal from this oscillator to the intermediate frequency amplifier of the meter circuit. As will be described presently, the oscillator 45 provides a signal of known standard deviation at the frequency of the intermediate frequency stages 15 and 33 so that the indication of meter 37 may indicate a standard of comparison for other signals applied to the modulation meter. Once the meter has been calibrated in this manner, switch 40 may be placed upward in order to couple a signal from the repeater station equipment to this device so that the modulation percentage of the signal translated thereby may be compared with the previously determined meter indication. If adjustment is necessary, the variable control 21 may be adjusted to provide a signal of the proper amplitude so that transmitter 22 will produce a signal of desired deviation.

It is possible to use a signal from the calibrator oscillator 45 in testing the repeater station equipment. If switch 47 is in the upward position, the signal from this oscillator will be translated through a portion of the repeater station equipment and to the modulation meter which will then give an indication of the modulation gain of this portion of the repeater station equipment, and any necessary adjustment of the repeater equipment may then be made.

Turning now to Fig. 2, there is shown a diagram of the of the calibrator oscillator 45. This circuit includes a pair of electron valves 50 and 51, which may be sections of a dual triode, connected as a multivibrator. The grid of valve 50 is coupled to the cathode thereof through resistor 52 and the grid of valve 51 is coupled to the cathode of this valve through resistor 53. Cathodes of the two valves are joined by capacitor 55 and resistor 56 connects the cathode of valve 50 to ground and resistor 57 connects the cathode of valve 51 to ground. The plate of valve 50 is coupled to the grid of valve 51 through capacitor 58 while capacitor 59 connects the plate of valve 51 and the grid of valve 50. Resistors 60 and 61 connect the plates of valves 50 and 51 respectively to a B+ potential supply.

This multivibrator controls a pair of oscillator circuits which are of similar construction except that the frequency produced by each differs by a selected amount. The signal developed at the anode of valve 50 is applied to the grid of oscillator valve 64 through capacitor 66 and resistor 68. At the junction of this resistor and capacitor is connected resistor 70 to ground and a series combination of resistor 72 and capacitor 74 also to ground. The junction of resistor 72 and capacitor 74 provides a convenient test point for checking operation of the device. The cathode of the oscillator valve 64 is connected to ground and B+ is provided for the plate of this valve through load resistor 76. Connected between the grid and plate of valve 64 is a series connection of the circuit consisting of a parallel arrangement of inductor 78 and capacitor 80, blocking capacitor 82, and a parallel arrangement of the tuned circuit including inductor 84, crystal 86 and resistor 88.

The output of the oscillator is coupled from the plate of valve 64 through capacitor 90 and is applied across resistor 92 through resistor 94 and a parallel combination of capacitor 96 and inductor 98. The side of resistor 92 which is connected to the oscillation circuit of capacitor 96 and inductor 98 is also connected to ground.

During one half of the signal coupled from the multivibrator to the grid of oscillator valve 64 this valve is cut off while on the other half of the signal coupled thereto this circuit oscillates at the frequency determined by the crystal 86 to produce a signal which appears across resistor 92. In circuitry which is entirely similar to that described for the oscillator utilizing valve 64, a second oscillator incorporating valve 65 is included. This valve may be one half of a dual triode vacuum tube. The frequency of the signal produced by this oscillator is determined by the crystal 87 and is keyed to become operative by a signal coupled from the plate of valve 51. Therefore, the signals from these two oscillators will appear alternately across resistor 92 at the frequency at which the multivibrator operates. The circuits including inductor 78, capacitor 80 and capacitor 96 and inductor 98 and the corresponding components in the output of the other oscillator function as isolating elements to prevent interference between the two oscillator circuits.

The frequency of operation of each of the oscillators is fixed to be such that they will give an indication in the modulation meter which is equivalent to the desired modulation percentage. However, since the oscillators are keyed by an essentially square wave from the multivibrator, the difference in frequency between the signals produced by these two oscillators will not correspond to the actual difference which is produced by the usual frequency modulation of a signal. It has been determined that to give an indication in a meter of a known type, which is equivalent to normal deviation of the carrier wave of $\pm 3$ megacycles about a 75 kc. center frequency, that one oscillator must produce a signal of 77.1 megacycles and the other must produce a signal of 72.9 megacycles. That is, due to the abrupt keying of the oscillators, it was found necessary to deviate the center frequency by $\pm 2.1$ megacycles to give a reading equivalent to a deviation of $\pm 3$ megacycles with the usual modulation. Of course, for other frequencies and deviations the proper oscillator frequencies may be determined mathematically or experimentally.

It may be seen that this oscillator circuit is an inexpensive and easily portable device to provide a known deviation for calibrating a modulation meter. Furthermore, the circuit may also be used when coupled to a microwave repeater station to provide a test signal for such a station. The circuit has the advantage of providing a selected full deviation of a microwave testing signal in apparatus of simple construction. In addition the signal characteristics are selected and accurately fixed so that a suitable non-changeable standard is provided.

While a particular embodiment of the invention has been shown and described, changes may be made and it is intended to cover all such changes and modifications as fall within the scope of the invention as defined in the appended claims.

What is claimed is:

1. Modulation testing apparatus for microwave relay equipment including a relay receiver and a relay transmitter for receiving and retransmitting a microwave signal, said apparatus including a modulation meter with indicator means to indicate modulation percentage of a frequency modulated signal applied thereto, calibrating signal means for producing a frequency modulated signal of standard deviation, said calibrating signal means including a pair of oscillators operative periodically and alternately at predetermined frequencies which define the limits of said standard deviation, and circuit means for coupling said calibrating signal means to said modulation meter, said circuit means being adapted to connect said modulation meter to the relay transmitter, whereby said signal of standard deviation gives an indication of said indicator means for comparison with an indication produced by a signal applied to said modulation meter from said transmitter.

2. Modulation testing apparatus for microwave relay repeater equipment including a relay receiver and relay transmitter to receive and retransmit a microwave signal, said apparatus including a test receiver with indicator means to indicate a value proportional to the modulation percentage of a signal impressed thereon, a calibrator circuit including a pair of oscillators for producing a pair of standard signals differing by a selected frequency and means to couple said signals periodically and alternately to an output circuit, circuit means for connecting said output circuit to said relay receiver and to said test receiver, and circuit means for coupling a signal from said relay transmitter to said test receiver whereby a signal directly from said calibrator circuit produces a response of said indicator means corresponding to the deviation between said pair of standard signals and a signal from said calibrator circuit coupled through said relay receiver and relay transmitter produces a response of said indicator means corresponding to the deviation between said pair of standard signals after passing through the microwave relay equipment to thereby indicate the modulation characteristics of the microwave relay equipment.

3. The method of measuring the modulation percentage of a signal relayed by a radio relay repeater station which includes a radio relay receiver coupled to a radio relay transmitter, said method including the steps of, alternately rendering first and second oscillators operative at frequencies differing by the equivalent of a standard deviation, combining the waves from the first and second oscillators to produce in effect a frequency modulated signal, applying said frequency modulated signal to a modulation meter to establish the standard deviation, applying said frequency modulated signal to the repeater receiver, and applying the output of the repeater transmitter to the modulation meter to provide an indication for comparison with said standard deviation.

4. The method of determining when a desired modulation percentage exists in a radio relay repeater station which includes a receiver and transmitter with the receiver applying received signals to the transmitter for retransmission, said method including the steps of, coupling a frequency modulated signal made up of two signal components of constant known frequency to a modulation meter to establish a standard indication thereof, impressing said frequency modulated signal on the repeater receiver, and coupling the modulation meter to the repeater transmitter to produce an indication of the modulation meter for comparison with said standard indication.

5. Deviation measuring apparatus for frequency modulation wave signal equipment adapted to demodulate a first carrier wave and transmit a second carrier wave which deviates between first and second frequencies including in combination, a modulation meter with indicator means to provide an indication proportional to the percentage modulation of a frequency modulated signal impressed thereon, a calibrating circuit including a pair of oscillators for producing respective signals having frequencies related to the first and second frequencies, said circuit including output means and means to apply said signals periodically and alternately to said output means, and circuit means including a first portion for connecting said output means to the wave signal equipment and for connecting said wave signal equipment to said modulation meter, and a second portion operative alternately with said first portion for connecting said output circuit to said modulation meter for applying said signals thereto, whereby said signals applied directly to said modulation meter produce a response at said indicating means of the frequency deviation therebetween, and said signals applied through the wave signal equipment to said modulation meter produce a response at said indicator means of the frequency deviation produced by the wave signal equipment.

References Cited in the file of this patent

UNITED STATES PATENTS

| | | |
|---|---|---|
| 2,309,481 | Summerhayes | Jan. 26, 1943 |
| 2,419,527 | Bartelink | Apr. 29, 1947 |
| 2,427,191 | Brink | Sept. 9, 1947 |
| 2,448,336 | Weiner | Aug. 31, 1948 |